(12) United States Patent
Kuca et al.

(10) Patent No.: US 11,714,497 B2
(45) Date of Patent: Aug. 1, 2023

(54) ELECTRONIC DOCUMENT SYSTEMS, METHOD AND USES

(71) Applicant: Vica Digital Solutions Inc., Hamilton (CA)

(72) Inventors: Philip Kuca, Hamilton (CA); John Vitulli, Hamilton (CA)

(*) Notice: Subject to any disclaimer, the term of this patent is extended or adjusted under 35 U.S.C. 154(b) by 303 days.

(21) Appl. No.: 16/932,565

(22) Filed: Jul. 17, 2020

(65) Prior Publication Data

US 2021/0019500 A1    Jan. 21, 2021

Related U.S. Application Data

(60) Provisional application No. 63/001,752, filed on Mar. 30, 2020, provisional application No. 62/875,543, filed on Jul. 18, 2019.

(51) Int. Cl.
| | |
|---|---|
| *G06F 3/0354* | (2013.01) |
| *H04L 9/32* | (2006.01) |
| *G06F 21/32* | (2013.01) |
| *G06F 16/93* | (2019.01) |
| *G06V 40/30* | (2022.01) |
| *G06V 40/16* | (2022.01) |

(52) U.S. Cl.
CPC .......... *G06F 3/03545* (2013.01); *G06F 16/93* (2019.01); *G06F 21/32* (2013.01); *G06V 40/172* (2022.01); *G06V 40/30* (2022.01); *H04L 9/3247* (2013.01)

(58) Field of Classification Search
CPC ...... G06V 40/30; G06V 10/12; G06V 40/172; G06F 3/03545; G06F 16/93; G06F 21/32; H04L 9/3247; H04L 63/00

USPC .......................................................... 382/119
See application file for complete search history.

(56) References Cited

U.S. PATENT DOCUMENTS

| | | | | |
|---|---|---|---|---|
| 4,924,175 A | * | 5/1990 | Clinton | G01R 31/2603 324/121 R |
| 6,148,093 A | * | 11/2000 | McConnell | G06V 10/12 382/119 |
| 6,307,955 B1 | * | 10/2001 | Zank | G06V 40/30 382/121 |
| 9,176,942 B1 | * | 11/2015 | McLaughlin | G06F 40/166 |
| 9,614,680 B2 | * | 4/2017 | Weissinger | H04L 9/3247 |

(Continued)

FOREIGN PATENT DOCUMENTS

| | | | | |
|---|---|---|---|---|
| WO | WO-2009149855 A1 | * | 12/2009 | G10H 1/0008 |

*Primary Examiner* — Mahendra R Patel
(74) *Attorney, Agent, or Firm* — Ridout & Maybee LLP

(57) ABSTRACT

A system includes a pair of devices, each having a display, configured to receive a document and, in use, in receipt of the document. The devices are configured to cause the document to appear simultaneously on the displays. Each device is further configured: when the document appears simultaneously, to permit a signature to be placed on the display of each device; and such that, when a signature is placed upon the display of one of the pair, the signature appears on the display on the one of the pair and on the display of the other of the pair. In a method, there is received: signature data; first image data including an identification document; second image data including an image of the user. A confidence level is determined based on the data and verified signature data. If the level exceeds the threshold, an electronic document including the signature data generates.

6 Claims, 23 Drawing Sheets

(56) References Cited

U.S. PATENT DOCUMENTS

| | | | |
|---|---|---|---|
| 10,453,058 B2* | 10/2019 | Bartley | G06F 40/166 |
| 11,061,744 B2* | 7/2021 | Louch | G06F 3/03545 |
| 2003/0142855 A1* | 7/2003 | Kuo | G07C 9/24 |
| | | | 382/119 |
| 2012/0036181 A1* | 2/2012 | Isidore | H04L 67/52 |
| | | | 709/203 |
| 2015/0012812 A1* | 1/2015 | Wu | G06F 40/143 |
| | | | 715/234 |
| 2015/0254471 A1* | 9/2015 | You | G06F 21/6245 |
| | | | 726/19 |

* cited by examiner

Welcome, Sally Smith!

You will need to complete the following:

☑ Take a photo of yourself using this device

☑ Provide a signature using the stylus

☑ Photograph 2 pieces of identification

ID one: | Drivers License ▼ |

Passport
         Drivers License
ID two:  Credit Card
         Health Card
         Birth Certificate

FIG. 16

OVERVIEW

| Signatories | Signatures | Initials |
|---|---|---|
| Andrea Colon | 1 | 2 |
| Belinda Ng | 2 | 2 |
| Calvin Kwok | 2 | 2 |
| Caio Nixon | 1 | 2 |

| Pages | Signatures | Initials |
|---|---|---|
| 1 | 0/3 | 0 |
| 2 | 0 | 0/3 |
| 3 | 0/3 | 0/3 |
| 10 | 0 | 0/3 |

ELECTRONIC DOCUMENT SYSTEMS, METHOD AND USES

FIELD

The described embodiments relate to electronic documents and include systems and methods of electronically authenticating one or more users signing an electronic document, such as a contract or other legal document, using an electronic device.

BACKGROUND

Various types of documents require a signature as proof of the signer's intent or acknowledgement. For some of these documents, verification of the signer's identity is required at the time of, or prior to, the document being signed.

For example, authentication may be required to satisfy various legal or regulatory requirements. Some legal systems require documents such as declarations or affidavits to be signed when a party has been identified. In some cases, identifying the signatory to a document may also be useful to mitigate or reduce fraud.

Currently, most verification is done manually, with a trusted person (for example, a notary or a lawyer) taking steps to manually inspect things like documents and so on. However, manual verification of a signer's identity may be slow, inaccurate, and cumbersome. Moreover, it may be difficult to verify the signor's identity if the signor is in a remote location, which is possible when signing an electronic document. For example, a contract may be executed between parties located in different locations, such as a first party in the United States and a second party in England.

Further, it remains commonplace for documents to be printed and signed in ink, despite the advantages available through the use of electronic documents and notwithstanding that many jurisdictions have enacted legislation, such as the Electronic Commerce Act of Ontario, to permit the use of electronic documents.

SUMMARY

System

Forming one aspect of the invention is a system for use with a document, the system comprising a pair of devices.

Each device has a display, is configured to receive the document and, in use, is in receipt of the document.

The pair of devices is configured to cause the document to appear simultaneously on the displays.

Each device is further configured: when the document appears simultaneously on the displays, to permit a signature to be placed on the display of said each device; and such that, when a signature is placed upon the display of one of the pair of devices, the signature appears on the display on the one of the pair and on the display of the other of the pair.

According to another aspect of the invention, each device can be a tablet computer.

According to another aspect of the invention, the tablet computer can have a stylus and be configured to permit the signature to be placed on the display using the stylus.

According to another aspect of the invention, the device can be adapted to track the position of the tip of the stylus as a function of time at least periodically through the placement of the signature.

According to another aspect of the invention, the device can be adapted to track the pressure of the tip of the stylus as a function of time at least periodically through the placement of the signature.

Method

Forming another aspect of the invention is a method for use with the system, a document and by a pair of persons. The method comprises:

distributing the document and the devices to the persons and operating the devices such that:
one of the pair of persons is in possession of one of the pair of devices;
the other of the pair of persons is in possession of the other of the pair of devices and in view of the one of the persons; and
the document appear simultaneously on the displays;
receiving the signature of the other of the pair of persons on the document while such other remains in the view of the one; and
receiving the signature of the one of the pair of the persons on the document.

According to another aspect of the invention, in respect of each of the persons, the signature of said each person is placed via the stylus of the tablet computer in respect of which said each person is in receipt.

According to another aspect of the invention, the position of the tip of the stylus as a function of time is tracked at least periodically through the placement of the signature.

According to another aspect of the invention, the pressure of the tip of the stylus is tracked as a function of time at least periodically through the placement of the signature.

Use

Forming another aspect of the invention is a use of the method, wherein the document is a legal document, the other of the pair of persons is an authorized signatory to the legal document and the one of the pair of persons is a qualified witness.

Computer-Implemented Method

Forming another aspect of the invention is a computer-implemented method for authenticating a user signing an electronic document. This method comprises the steps: receiving signature data; receiving first image data, the first image data including an identification document; receiving second image data, the second image data including an image of the user; determining a confidence level based on the first image data, the second image data, the signature data, and verified signature data; determining if the confidence level exceeds a predetermined threshold; and if the confidence level exceeds the predetermined threshold, generating the electronic document, the electronic document including the signature data.

According to another aspect, determining the confidence level can comprise: comparing the first signature data with the verified signature data; and comparing the first image data with the second image data.

According to another aspect, if the confidence level exceeds the predetermined threshold, the predetermined signature data can be updated based on the signature data.

According to another aspect, if the confidence level does not exceed the predetermined threshold, the method comprises: transmitting the first image data, the second image data, and the signature data to a computer device; and receiving, from the computer device, a second confidence level.

According to another aspect, the method can further comprise receiving biometric data and determining the confidence level can be further based on the biometric data.

According to another aspect, the method can further comprise receiving third image data, the third image data including a second identification document and determining the confidence level can be further based on the third image data.

According to another aspect, the method can further comprise receiving location data and determining the confidence level can be further based on the location data.

According to another aspect, the signature data can include at least one of: speed data, pressure data, trajectory data, and duration data.

According to another aspect, the predetermined signature data can include at least one of: speed data, pressure data, trajectory data, and duration data.

According to another aspect, the first image data can be received at a first time; the second image data can be received at a second time; and determining the confidence level can be further based on the first time and the second time.

According to another aspect, the signature data can be received at a third time; and the confidence level can be further based on the third time.

According to another aspect, the method can further comprise: receiving login data; transmitting the login data to a server; and receiving confirmation data from the server; wherein determining the confidence level is further based on the confirmation data.

Advantages, features and characteristics of the invention will become evident upon review of the following detailed description of non-limiting embodiments of the invention.

BRIEF DESCRIPTION OF THE DRAWINGS

FIG. 14 is a schematic diagram showing document and transactional information for the document of FIG. 11.

FIG. 16 is another schematic diagram of the user verification process of FIG. 15.

FIG. 22 is a schematic diagram of a document overview screen on the device of FIG. 3.

Figure 1:
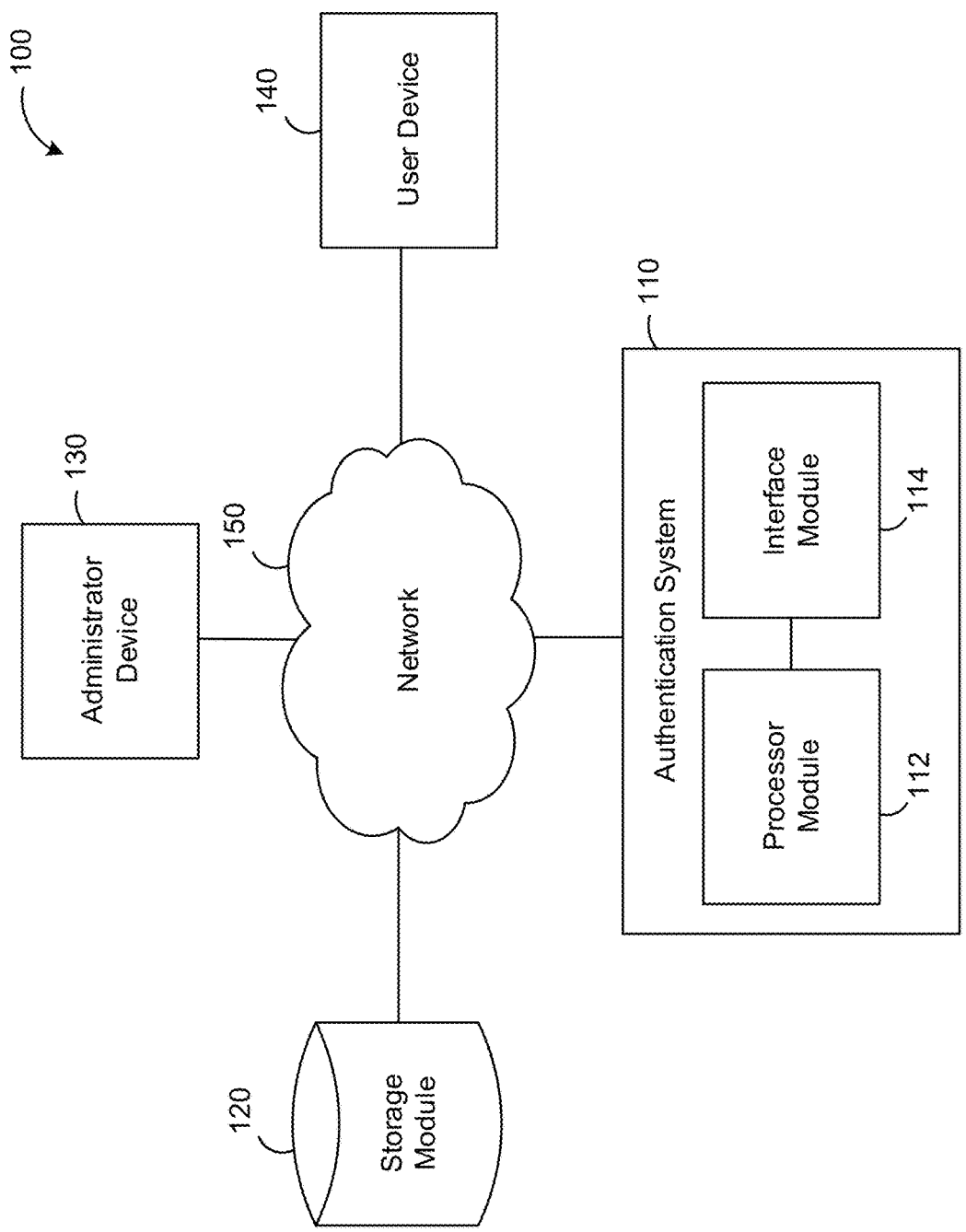
FIG. 1 is a block diagram of a system for authenticating a user signing an electronic document, in accordance with one example embodiment.

The drawings, described below, are provided for purposes of illustration, and are not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF VARIOUS EMBODIMENTS

Explanatory

The various embodiments described herein generally relate to systems methods for authenticating a user signing an electronic document. The systems and methods may assist with reducing fraudulent activity and satisfy various legal or regulatory requirements, and may generally otherwise facilitate the execution of electronic documents.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

For example and without limitation, the programmable computers (referred to herein as computing devices or electronic devices) may be a server, network appliance, embedded device, computer expansion module, a personal computer, laptop, personal data assistant, cellular telephone, smartphone device, tablet computer, a wireless device, an interactive television, video display terminals, gaming consoles, and portable electronic devices or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer usable instructions may also be in various forms, including compiled and non-compiled code.

System

The system is for use with a document and comprises a pair of devices, each device being a tablet computer having a display and a stylus.

In a set-up mode, at least one of the devices is configured to:
  capture a photograph of a face and a photograph of an identification document
  capture a video of the placement of a specimen signature on the other of the devices; and
  capture the specimen signature using the stylus, including tracking the position of the tip of the stylus and the pressure placed upon the tip of the stylus, as a function of time at least periodically through the placement of the signature.

In a signing mode, the at least one of the documents is configured to:
  permit the selection of a document from a repository
  cause the document to appear simultaneously on the displays
  choose a pen color
  selection portions of the document for viewing
  Each device is further configured:
  when the document appears simultaneously on the displays, to permit a signature to be placed on the display of said each device by the stylus; and
  such that, when a signature is placed upon the display of one of the pair of devices, the signature appears on the display on the one of the pair and on the display of the other of the pair.
  to track the position of the tip of the stylus as a function of time at least periodically through the placement of the signature.
  to track the pressure of the tip of the stylus as a function of time at least periodically through the placement of the signature.

Method

The method is for use with the system, a document and by a pair of persons and comprises a set-up step, a distribution step, a signing step and a witness step.

In the set-up step, the other of the devices is used to:
  capture a photograph of a face and a photograph of an identification document
  capture a video of the placement of a specimen signature on the other of the devices;
  capture the specimen signature using the stylus, including tracking the position of the tip of the stylus, and the pressure placed upon the tip of the stylus, as a function of time at least periodically through the placement of the signature; and
  the one device is used to:
  verify all of the captures
  select a document from a repository;
  cause the document to appear simultaneously on the displays;
  choose a pen color; and
  selection a portions of the document for viewing.

In the distribution step, the document and the devices are distributed to the persons and the devices are operated such that: one of the pair of persons is in possession of one of the pair of devices; the other of the pair of persons is in possession of the other of the pair of devices and in view of the one of the persons; and the document appears simultaneously on the displays.

In the signing step:
  the signature of the other of the pair of persons on the document is received, via the stylus of the tablet computer in respect of which said other person is in receipt, while such other remains in the view of the one; and
  the position of the tip of the stylus and the pressure placed upon the tip of the stylus, as a function of time is tracked at least periodically through the placement of the signature.

In the witness step:
  the signature of the one of the pair of persons on the document is received, via the stylus of the tablet computer in respect of which said one person is in receipt; and the position of the tip of the stylus and the pressure placed upon the tip of the stylus, as a function of time is tracked at least periodically through the placement of the signature.

Use

In the use, the document is a legal document, the other of the pair of persons is an authorized signatory to the legal document and the one of the pair of persons is a qualified witness.

Persons of ordinary skill will readily appreciate that the foregoing provides significant advantage from the standpoint of, inter alia, legal closings: in contrast to the present situation wherein a plurality of documents [including many distinct documents, often in triplicate or more] are printed and circulated, either around a long boardroom table or via courier, for physical signature, a single set of documents may be produced.

Further, whereas a print signature is susceptible to forgery by a skilled and steady hand, the collection of speed and pressure data by the stylus allows for comparisons to be made to improve authentication techniques.

Whereas a specific system, method and use are described, it will be appreciated that variations are possible.

For example, whereas the system, method and use described involves two devices and two persons, it will be appreciated that, to the extent that execution of a document:
  requires more than one authorized signatory, a device can be provided for each of said more than one authorized signatories;
  requires more than one witness, a device can be provided for each of said more than one authorized witness.

Further, accommodations to the method may be made to remove signatures incorrectly placed.

As well, devices other than tablet computers, such as phones, can be used.

Additionally, signatures can be collected otherwise than by stylus, such as by a finger.

Further, whereas in the method, the signatory is indicated to be in view of the witness, it may be possible in some jurisdictions for the signatory to be in view of the witness via electronic means.

Yet further, whereas in the described method, images are collected from the signatory and the witness, and data is collected from the stylus, these steps are not strictly necessary.

Further, whereas in the described embodiments, the speed and pressure of the stylus are tracked during the placement of each signature, this is not necessary.

Although the specification describes two persons, each placing a single signature, it will be appreciated that multiple signatures could be placed in a single session, and either of the parties holding a tablet could have the ability to scroll the document.

The pair of persons need not be a signatory and a witness; both parties could be signatories and in view of one another. As well, the witness could be a Commissioner of Oaths or Notary, and the document could provide for placement of an image of a seal or another suitable annotation on the document responsive to, for example, a drag-and-drop tool.

The signatures need not be written signatures and could, for example, by electronic signatures, such as those provided by DocuSign. Signatures could be placed automatically responsive to a fingerprint.

Further, a system 100 for authenticating a user signing an electronic document can be used as shown in FIG. 1.

Authentication System

System 100 may include one or more electronic communication components, such as (for example) an authentication system 110 for authenticating a user. For example, this may be done for the purposes of identifying a user when an electronic document is being signed.

The authentication system 110 may include a processor module 112, which may be configured to receive, process, and send instructions. This could include instructions related to a request to authenticate a user, a request to generate an authentic user profile, and so on.

The authentication system 110 may also include an interface module 114. In interface module may include one or more I/O devices for interacting with the processor module 112. For example the interface module may include a display (which could be a touchscreen display), a keyboard (which could be a touchscreen keyboard), and/or a communication module for communicating with other components of the system 100 (for example via the network 150, which could for instance include the internet).

The system 100 may also include a data storage module 120 for storing data. For instance, the storage module 120 could include data about one or more users, one or more documents, one or more authentication requests, and so on. In some cases the storage module 120 may include encrypted data.

The system 100 may also include an administrator device 130. The administrator device 130 may be operable to control other features of the system 100, such as setting up new users, creating new documents, configuring access and authentication requirements, creating user accounts and so on. In some cases, the administrator device 130 may be associated with a particular user, often an administrator or "superuser" of the system, who is often a trusted individual. The administrator device 130 may generally be any suitable electronic device.

The system 100 may also include a user device 140. The user device 140 may generally be any suitable electronic device for interacting with electronic documents and for signing the same. The user device 140 may allow the user to enter data to generate an verified or authenticated user profile, for example by taking a photograph, storing signature information, or uploading identifying information.

Figure 2:
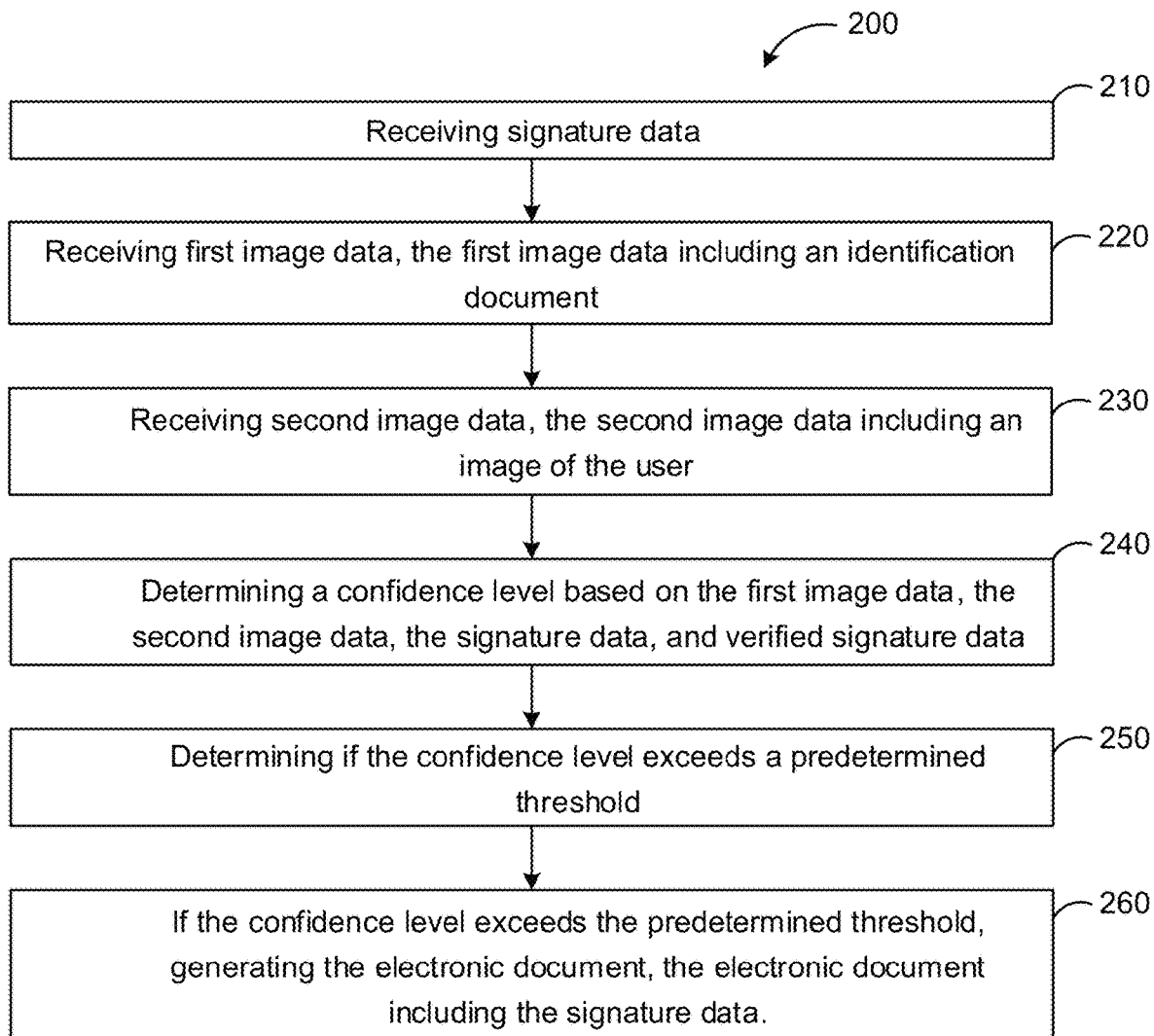
FIG. 2 is a flow chart of a method for authenticating a user signing an electronic document, in accordance with one embodiment.

Referring now to FIG. 2, shown therein is a computer-implemented method 200 for authenticating a user signing an electronic document according to one embodiment.

At 210, signature data is received. Signature data may refer to any data associated with a user's signature. For example, signature data may include information about the shape of a particular signature, such as the pattern of movement of a user's finger and/or stylus, that may be received on an electronic device (such as the user device 140). Generally, the signature data may be compared to previously recorded data about a user's signature in order to verify that the received signature data was created by (or was likely created by) the user of interest.

In some cases, the signature data may include other types of data. For instance the signature data could include at least one of speed data, pressure data, trajectory data, and duration data. Speed data may refer to the velocity at which one or more segments of a signature were signed. Pressure data may refer to the signing force applied at one or more segments of a signature during signing. Trajectory data may refer to the position of one or more segments of a signature. Trajectory data may also include data related to the shape, spacing, slope, size, or thickness of one or more segments of a signature. Duration data may refer to the time elapsed during signing one or more segments of the signature. One or more of these various types of data may be used to authenticate a user's signature.

Signature data may be measured in various ways. In some embodiments, signature data may be captured using a capacitive touch panel. For example, a user may sign a signature by moving their finger on or in contact with a touch panel. In some embodiments, signature data may be obtained from a stylus, such as an inductive pen.

In some embodiments, signature data is measured using one or more pressure sensors. For example, one or more pressure sensors may be positioned in a mat beneath a physical piece of paper to detect a writing utensil operated by a user. In some examples, the pressure sensors may be positioned within the writing instrument.

In some embodiments, the signature data is measured and received at the same device. In other embodiments, the signature data is measured at a first device, transmitted by the first device, and received at a second device. A comparison between received signature data and stored signature data may be done on one or more of the first device and second device.

At 220, first image data is received. The first image data may include an identification document. The identification document may refer to a document which may be used to identify an individual. For example, the identification document may be a government issued ID card that included an image of the individual. The image of the individual include a facial image. The identification document may also include the individual's signature. The identification document may also include other information about the individual, such as address, date of birth, sex, height, or weight.

In some cases, the identification document may be issued by a government or other organization. The identification document may be, for example, a driver's license, a passport, or a health card. The identification document may include one or more identifiers, such as a driver's license number, passport number, or health card number. The identification document might also be a credit card, debit card, or student card.

At 230, second image data is received. The second image data could include an image of the user. The image of the user may include the user's face. However, the image of the user may also include other regions of the user, such as the user's neck, upper body, or lower body. In some cases, the image might include biometric data, such as an image of an eye (e.g., an iris scan or other feature). In some cases, the image might include fingerprint data.

Where the image is of a user's face, the image may be framed in a similar manner to an image of the identification document of the first image data. For example, the two images may have a similar ratio of facial feature size to background size.

The first and second image data may include one or more still images or videos. The image data may be received in a variety of formats. For example, the image data may be received as a JPEG, GIF, PNG, TIFF, WMV, MOV file etc.

The first and second image data may be obtained in various ways. The image data may be obtained from one or more cameras, including visible light or infrared cameras. In some embodiments, the image data is captured from a camera of a mobile device, such as the user device 140.

Still referring to FIG. 2, at 240, a confidence level for the correspondence between the collected data (about the person signing the electronic document) and stored data (associated with a known user) is generated. This correspondence may be determined based on the first image data, the second image data, the signature data, and verified data (including for example verified signature data, and/or verified image data about a known user).

The confidence level of the correspondence generally refers to a measure of the system's certainty of user's identity. The confidence level may be a numerical value, such as a value between 0% and 100% or a value between 1 and 10. In other examples, the confidence level may be a non-numerical score, such as a score between A-F.

In some embodiments, determining the confidence level includes comparing the first signature data with the verified signature data. The verified signature data is signature data that was previously obtained from a user. The verified signature data may include one or more of image data, pattern data, speed data, pressure data, trajectory data, and duration data. It will be appreciated that various hand writing recognition techniques may be used to compare the first signature data with the verified signature data. The confidence level may be relatively higher if the first signature data is similar to the verified signature data.

In some embodiments, determining the confidence level includes comparing the first image data with the second image data. For example, if the identification document of the first image data includes an image of the user, that image may be compared to the image of the user of the second image data.

In some embodiments, only a portion of the images may be compared. For example, only a section of the images including a facial image may be compared. It will be appreciated that various image processing techniques may be used to normalize the first image data and the second image data. It will be appreciated that various facial recognition techniques may be used to compare the first image data with the second image data. The confidence level may be relatively higher if the first image data is similar to the second image data.

In some embodiments, determining the confidence level includes comparing the signature data to first image data. For example, if the identification document of the first image data includes a signature, that signature may be compared to the signature data. The confidence level may be relatively higher if the signature data is similar to the first image data.

In some embodiments, determining the confidence level includes comparing the first image data to verified image data. For example, if the identification document includes information about an individual, such information can be compared to other data sources. The confidence level may be relatively higher if the first image data is similar to the verified image data.

In some embodiments, determining the confidence level is further based on biometric data. In such embodiments, biometric data may be received prior to determining the confidence level. Biometric data may include physiological or behavior characteristics of a user. Biometric data may include fingerprints, iris patterns, DNA, or voice patterns. The biometric data may be compared to verified biometric data. The confidence level may be relatively higher if the biometric data is similar to the verified biometric data. The biometric data may also be analyzed in other ways. For example, the heart rate of a user may be analyzed to detect suspicious activity (resulting in a relatively lower confidence level). In some cases, biometric heart rate pattern data can be used to facilitate authentication.

In some embodiments, determining the confidence level is further based on third image data. In such embodiments, third image data may be received prior to determining the confidence level. The third image data may include a second identification document. The third image data may be compared to the first image data, the second image data, the signature data, or the verified signature data. The third image data may be compared to verified image data. The third image data may be compared to various other data or analyzed in any appropriate manner.

In some embodiments, determining the confidence level is further based on location data. In such embodiments, location data may be received prior to determining the confidence level. The location data may include data indicative of the location of the user. The location data may include, for example, GPS coordinates or an address. The location data may be compared to one or more locations of where the user is expected to be located. For example, only certain locations may be authorized signature locations.

The location data may also be analyzed based on the time the location data was received. For example, the user may be expected to be in certain locations at certain times. The confidence level may be relatively higher if the location data is consistent with the expected location. In some cases, this location data could be compared to other known location data to check for anomalies. For example, if the user was determined to be making purchase in New York City during a particular weekend, but was also supposedly seen to be signing a document in China during the same time period, this could be flagged as a potentially counterfeit signature attempt.

In some embodiments, determining the confidence level is further based on a first time when the first image data is received and a second time when the second image data is received. The first time may be compared to the second time to determine the time elapsed between receiving the identification document and the image of the user. The confidence score may be higher if the time elapsed is shorter. The confidence score may be relatively lower if the time elapsed is relatively longer. For example, a long elapsed time may be indicative of suspicious activity.

In some embodiments, determining the confidence level is further based on a third time when the signature data is received. The third time may be compared to the first time or the second time. That is, the time at which the signature data is received may be compared to the time at which the first image data is received or the time at which the second image data is received.

In some embodiments, determining the confidence level is further based on confirmation data received from a server. In such embodiments, login data is received. The login data is transmitted to a server and confirmation data is received from the server. For example, a user may provide login credentials for a bank account. The login credentials may be transmitted to a bank server, which may provide confirmation as to whether the provided login credentials are consistent with an identity. If the confirmation data is indicative that the login data is consistent, the confidence level may be higher than if the confirmation data indicates otherwise.

At 250, it is determined if the confidence level exceeds a particular threshold. The threshold may refer to a confidence level at which the user's identity is deemed to be verified. The threshold may be set by an administrator. In some embodiments, the threshold may be determined based on historical data.

At 260, if the confidence level exceeds a threshold, the electronic document that includes the signature data is generated. The electronic document may be generated by signing the electronic document with the signature data. For example, the user's signature may be inserted into a signature line of an electronic document.

In some embodiments, if the confidence level exceeds the threshold, the verified signature data is updated based on the signature data.

In some embodiments, if the confidence level does not exceed the threshold, the first image data, the second image data, and the signature data are transmitted to a computer device. For example, an administrator may receive the first image data, the second image data, and the signature data. The administrator can review first image data, the second image data, and the signature data in order to authenticate the user. In some embodiments, a second confidence level may be received from the computer device. That is, the administrator provides a second confidence level, rather than authenticating the user.

In some embodiments, if the confidence level does not exceed the threshold, additional data may be requested. For example, additional image data, signature data, biometric data, or location data may be requested. In some embodiments, the additionally requested data may be used to update the confidence level.

In some embodiments, the confidence level and the data used to obtain the confidence level may be stored. In such embodiments, the stored confidence level and data may be used to determine a confidence level.

Figure 3:
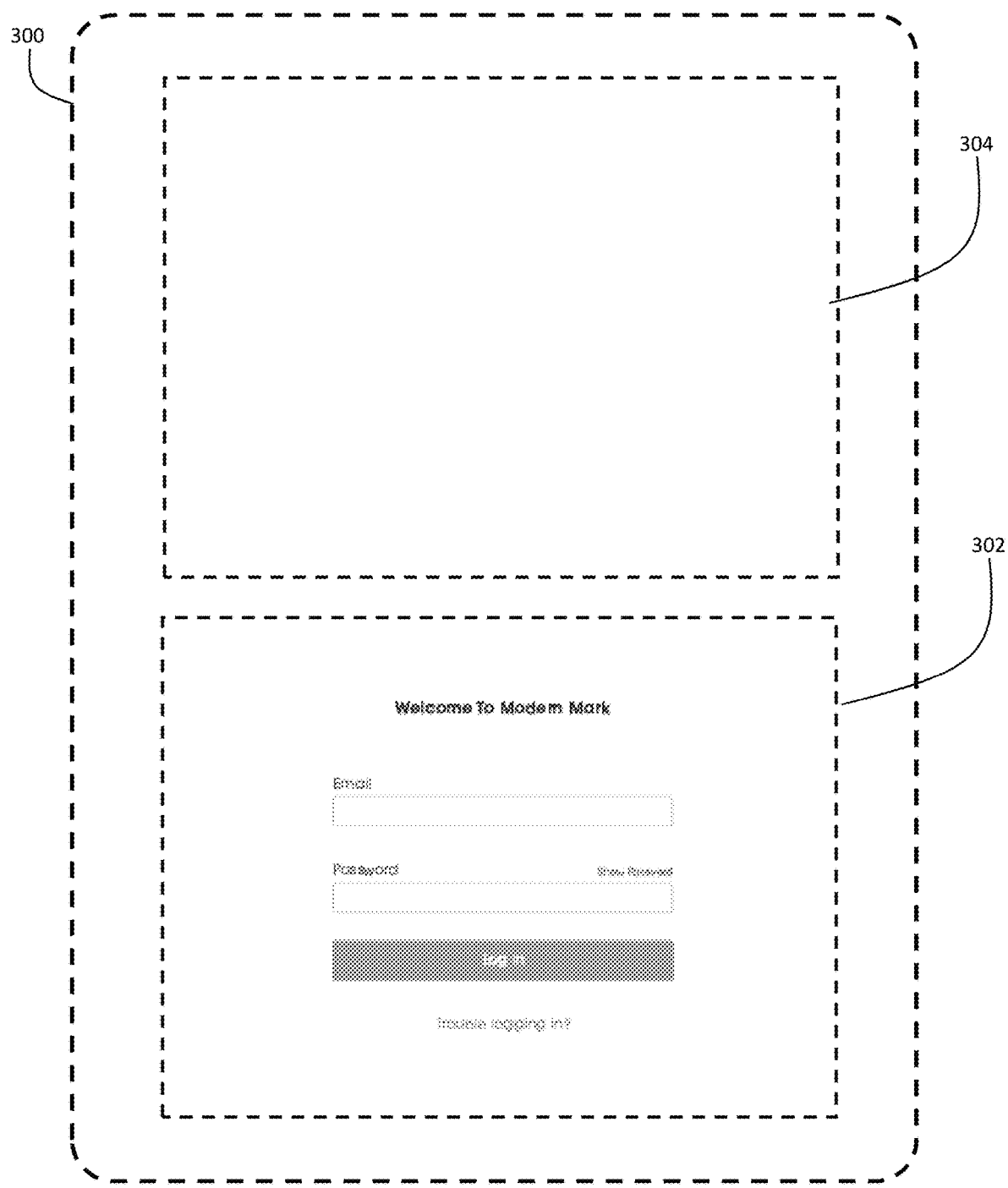
FIG. 3 is a schematic diagram of a welcome screen of a device configured for authenticating a user according to one embodiment.

Turning now to FIG. 3, illustrated therein is a schematic diagram of a welcome screen 302 of an electronic device 300 configured for authenticating a user according to one embodiment. In particular, the welcome screen 302 may allow a user to login to the system, for example by entering an identifier (i.e., an email address or user name) and a password. The welcome screen 302 may be accompanied by a second display area 304, which could include graphics or other information.

Figure 4:
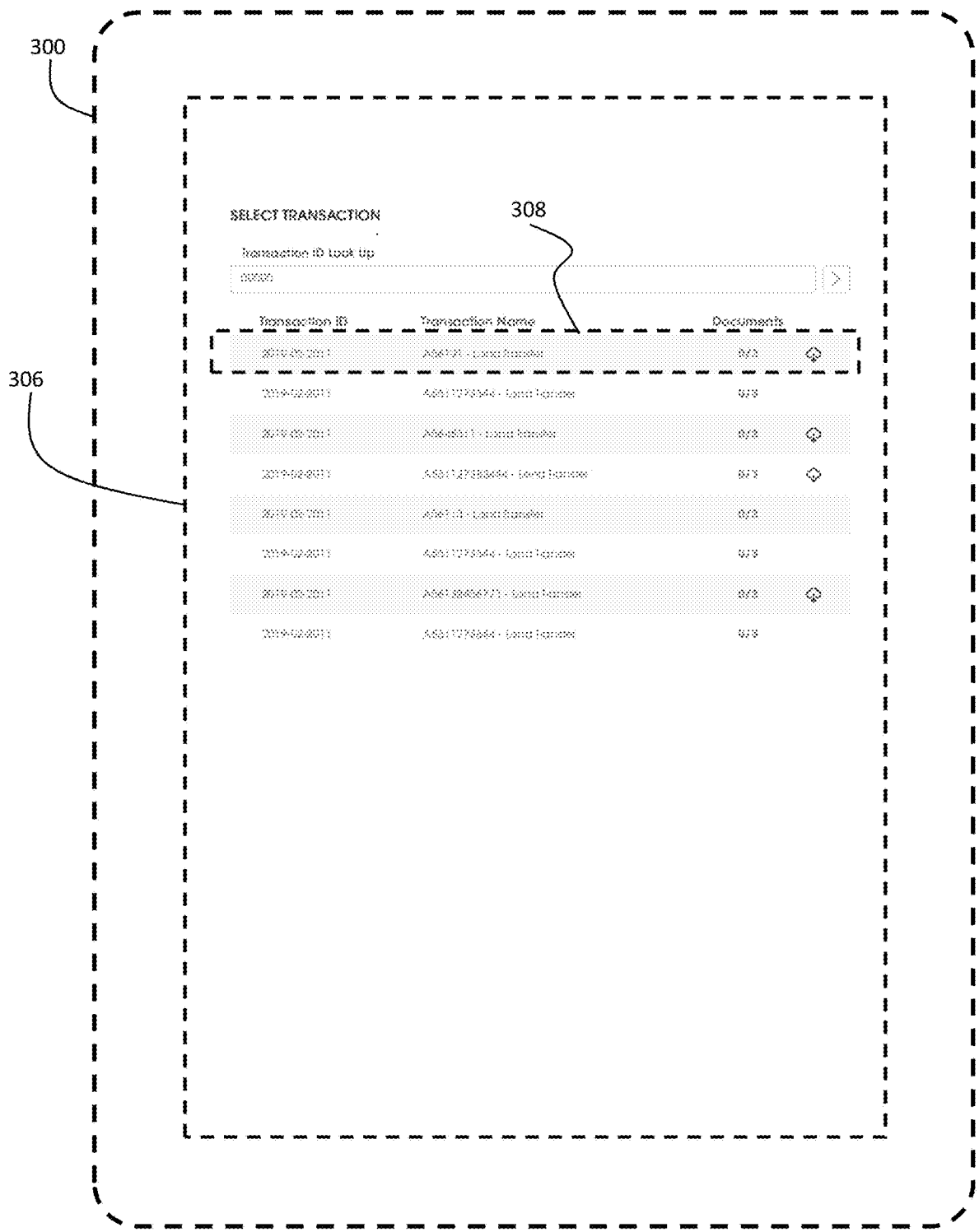
FIG. 4 is a schematic diagram of a transaction selection screen of the device of FIG. 3 configured for authenticating the user.

Once a user has logged into the system, they may see a screen such as FIG. 4, which shows a transaction selection screen 306. In particular, the transaction selection screen 306 may display a list of transactions currently associated with a particular user (such as a first transaction 308, which in this example is related to a land transfer). The list of transaction may include a transaction identifier, a transaction name, a list of documents associated with each transaction (and which may indicate if some or all have been signed), and a download option to allow the documents to be retrieved.

Figure 5:
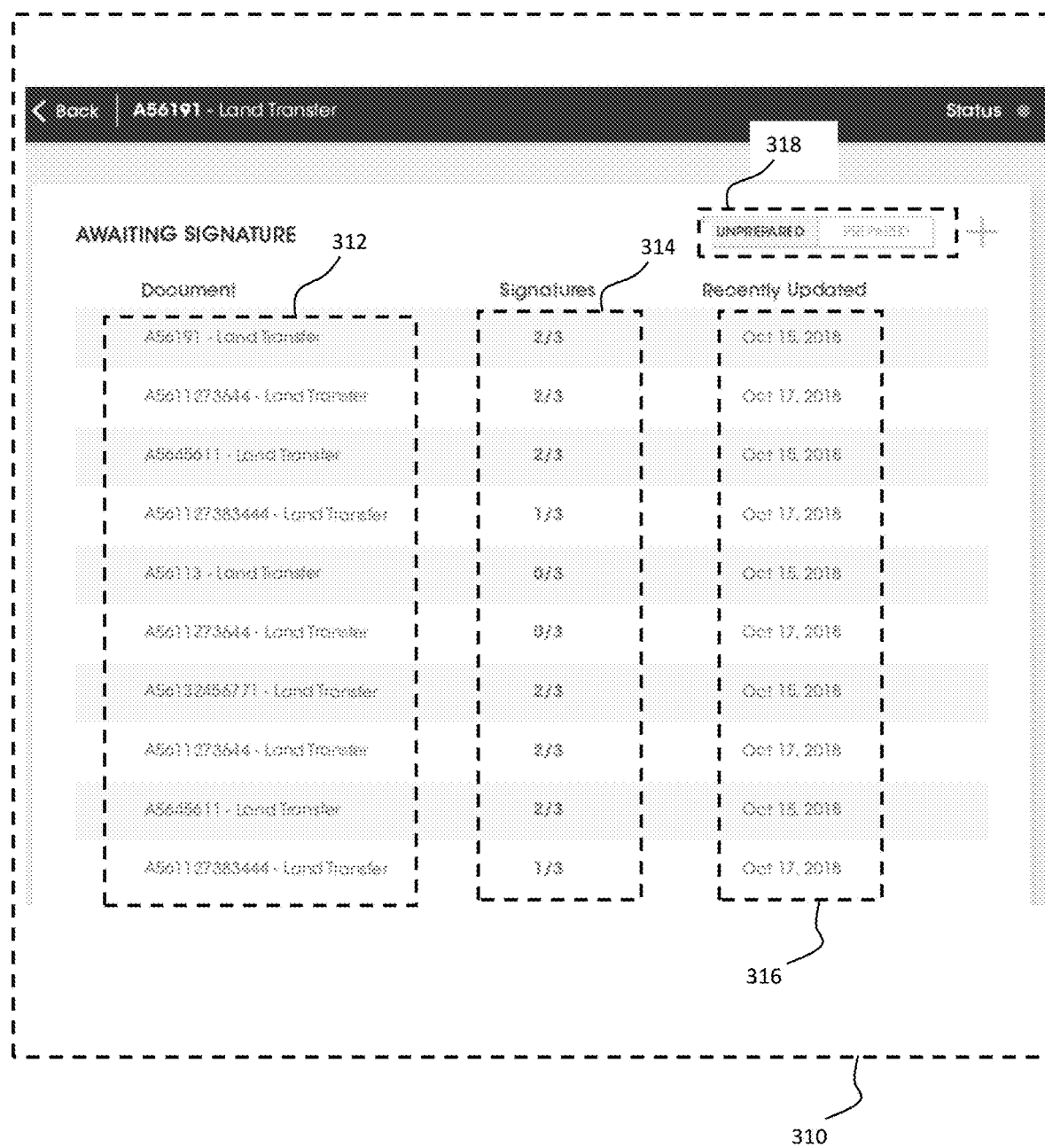
FIG. 5 is a schematic diagram of a signature status screen of the device of FIG. 3.

Turning now to FIG. 5, a signature status screen 310 of the device 300 is shown. This screen 310 presents the user with a list of documents 312, and provides status information about the documents, including signature status 314, and date information 316. The screen 310 may also allow the user to toggle between documents that have been prepared for signature, and those that are not yet prepared (for example using the toggle button 318).

Figure 6:
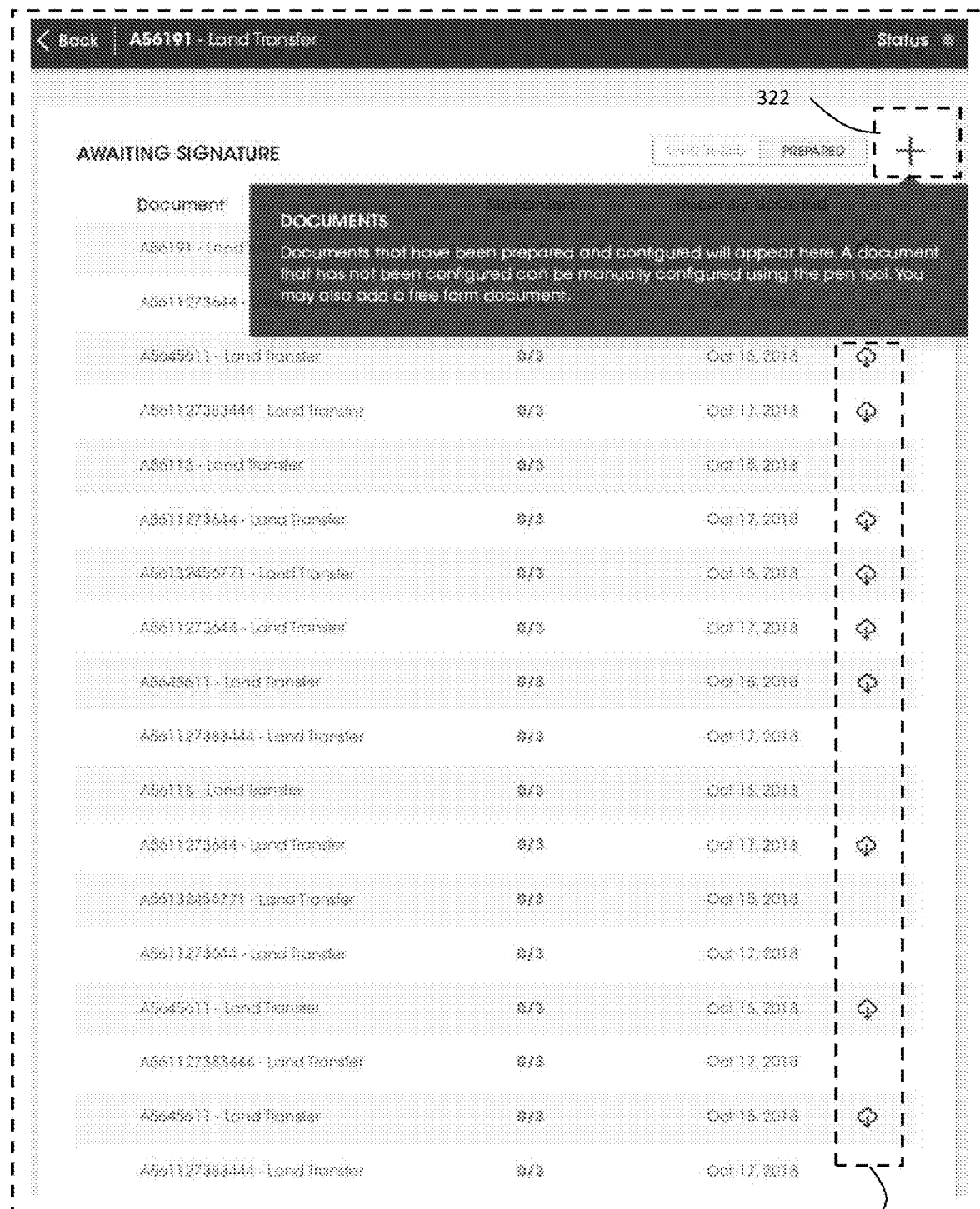
FIG. 6 is another schematic diagram of the signature status screen of FIG. 5.

FIG. 6 shows documents that still need to be prepared and/or configured for signature on a separate screen 320, which could be done by the user, or in some cases by an administrator. The user, for example, could add a new document using an add button 322, or could download documents from a list 324.

Figure 7:
FIG. 7 is a schematic diagram showing in the initialization of a document creation process on the device of FIG. 3.

Turning now to FIG. 7, illustrated therein is a schematic diagram showing in the initialization of a document creation process on a screen 325. Here the user could interact with the screen and data, in some cases via an input device such as a touchpad 326, to generate a new document. This could include assigning a new document ID, a new transaction ID, selecting a pen colour, and so on.

Figure 8:
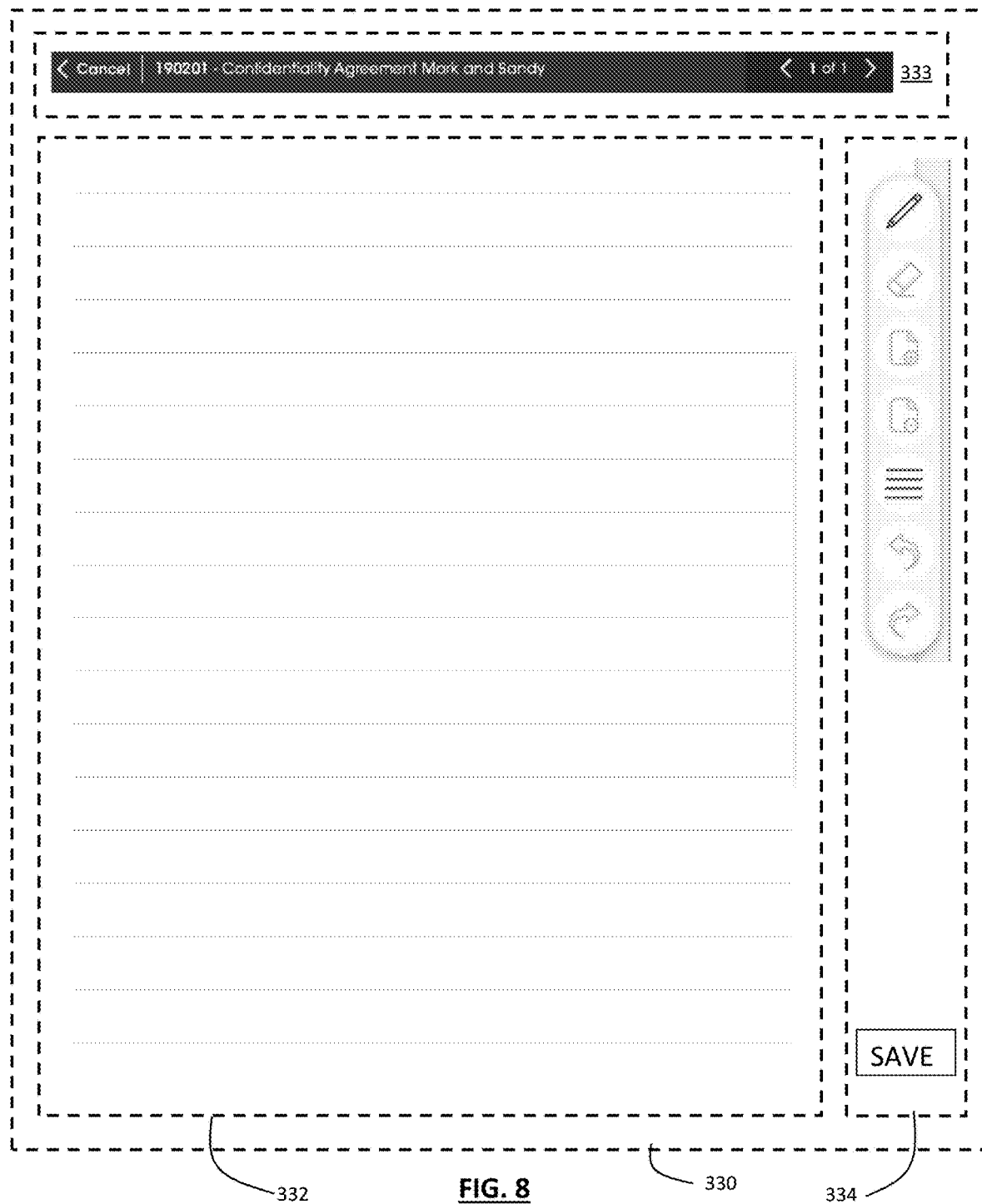
FIG. 8 is a schematic diagram of the document creation process of FIG. 7.

FIG. 8 is a schematic diagram of the document creation screen 330. A user can add data to a data screen 332 (perhaps by typing or by uploading a document), can navigate using controls 333, and can make revisions using a toolbar 334.

Figure 9:
FIG. 9 is a schematic diagram of a document information screen of the device of FIG. 3.

At FIG. 9, document information is displayed on a screen 340, along with signature settings 342 to be configured by the user/administrator. For example, an administrator could select from a list of users who have to sign 344, could define and/or confirm their roles 346, and confirm whether they have been verified 348.

Figure 10:
FIG. 10 is a schematic diagram of a user identification screen of the device of FIG. 3.

This could include reviewing the user's identification screen 350, as shown in FIG. 10. In particular, the identification screen 350 could include a username 352, a photo of the user 354, and a confirmed signature of that user 356, along with data such as when the photo and signature were received. The identification screen 350 may also include one or more pieces of ID, such as a drivers license 358 or a credit card 359.

Figure 11:
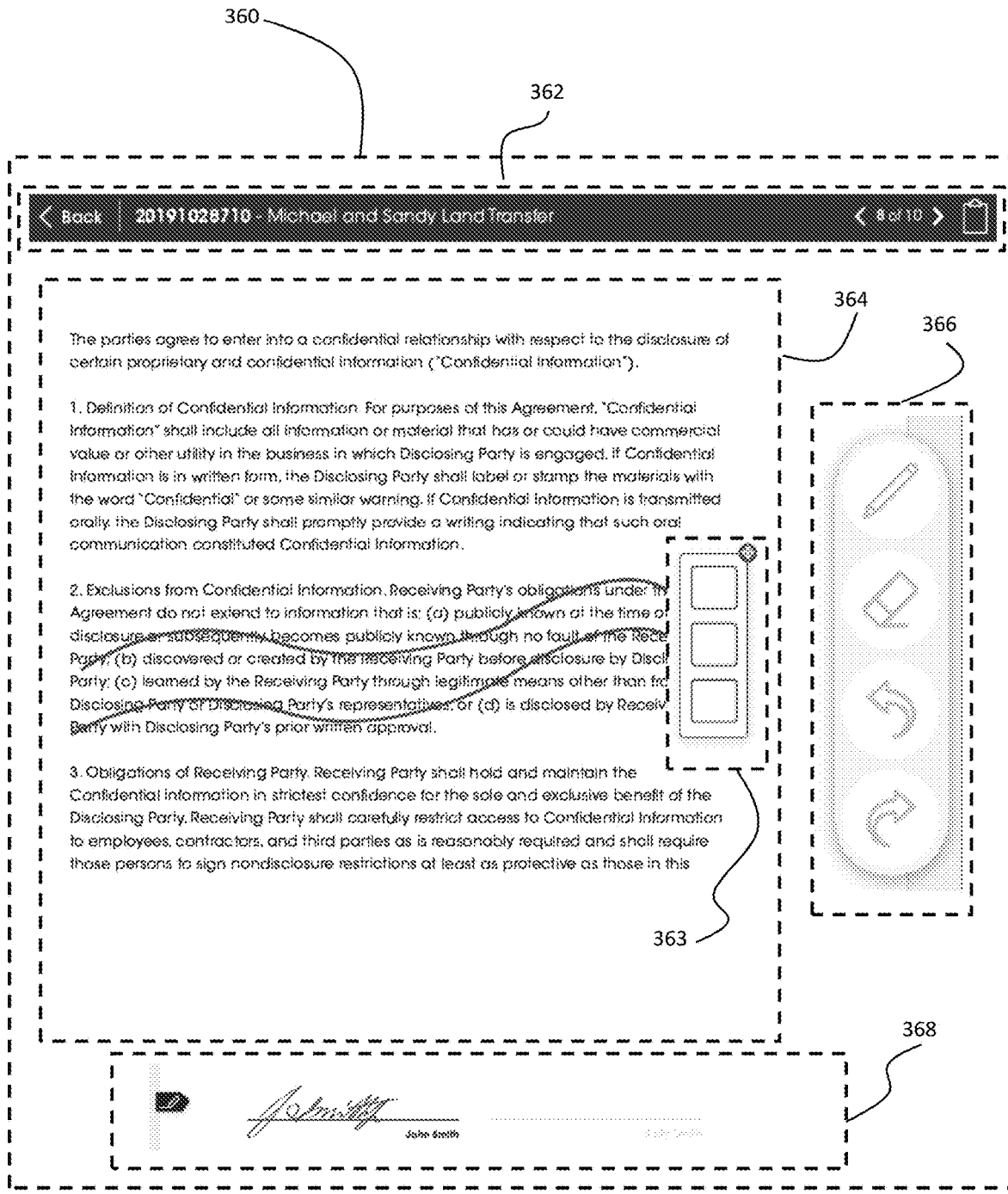
FIG. 11 is a schematic diagram of a document to be signed using the device of FIG. 3.

Turning now to FIG. 11, shown therein is a schematic diagram of a document to be signed on the screen 360 using the device 300. In particular, the screen 360 can include a navigation bar 362 along with the document 364 to be reviewed. The signature box 368 is shown at the bottom of the screen 360. Activating the signature box 368 can launch a signature entry screen 370 as shown in FIG. 12.

In some cases, the user can annotate or edit the document 364, for example using the toolbar 366 and selecting a pen tool to strike out portions of the text of the document 364 as shown. In some cases, these changes could be required to be initialed using the initial data box 363.

Figure 12:
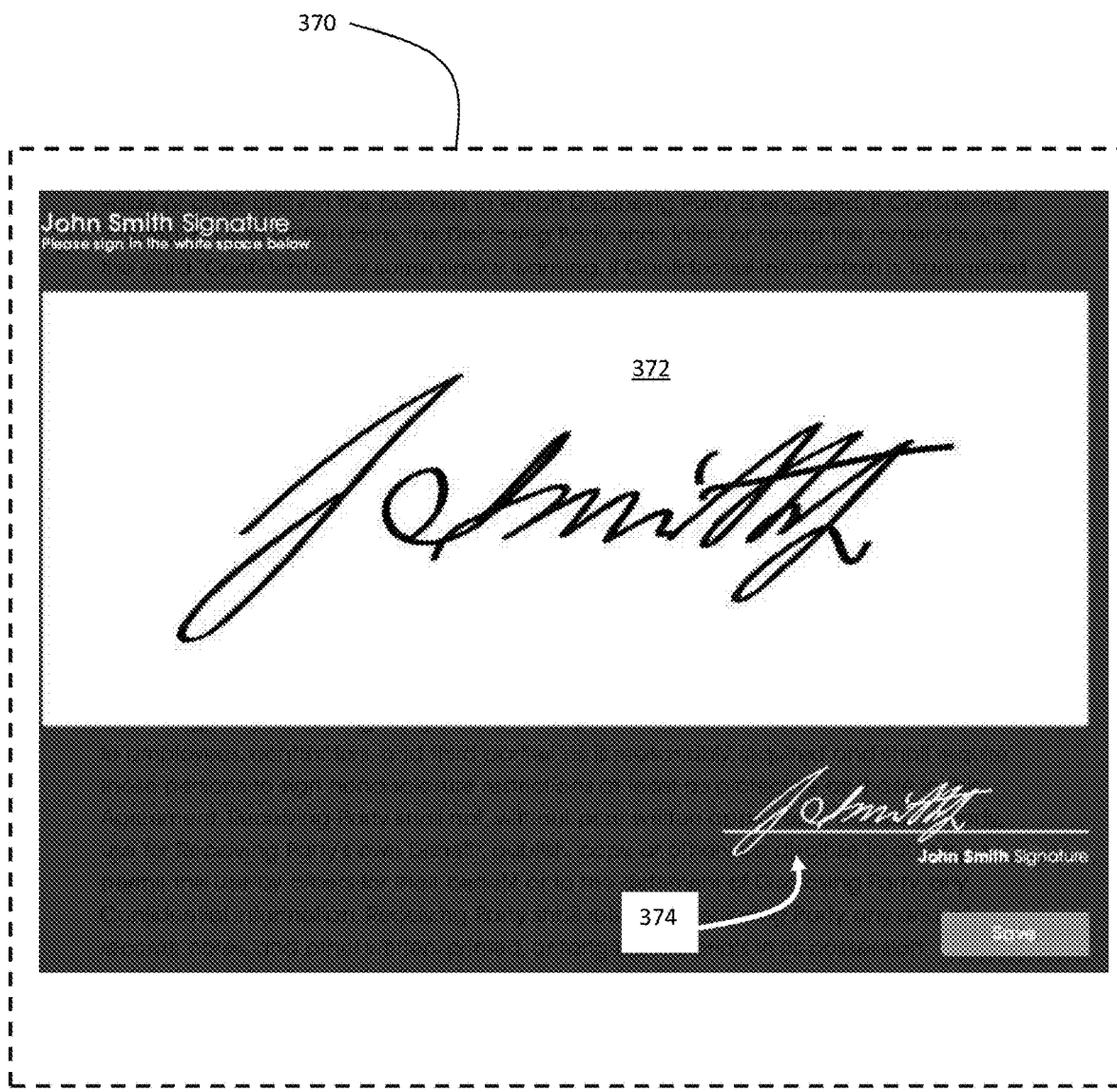
FIG. 12 is a schematic diagram of showing the signing of the document of FIG. 11.

In FIG. 12, the signature entry screen 370 is shown. A user can enter a signature in a defined area 372, could be done by stylus, with a finger, or another writing implement. A preview 374 of the completed signature can also be shown.

Figure 13:
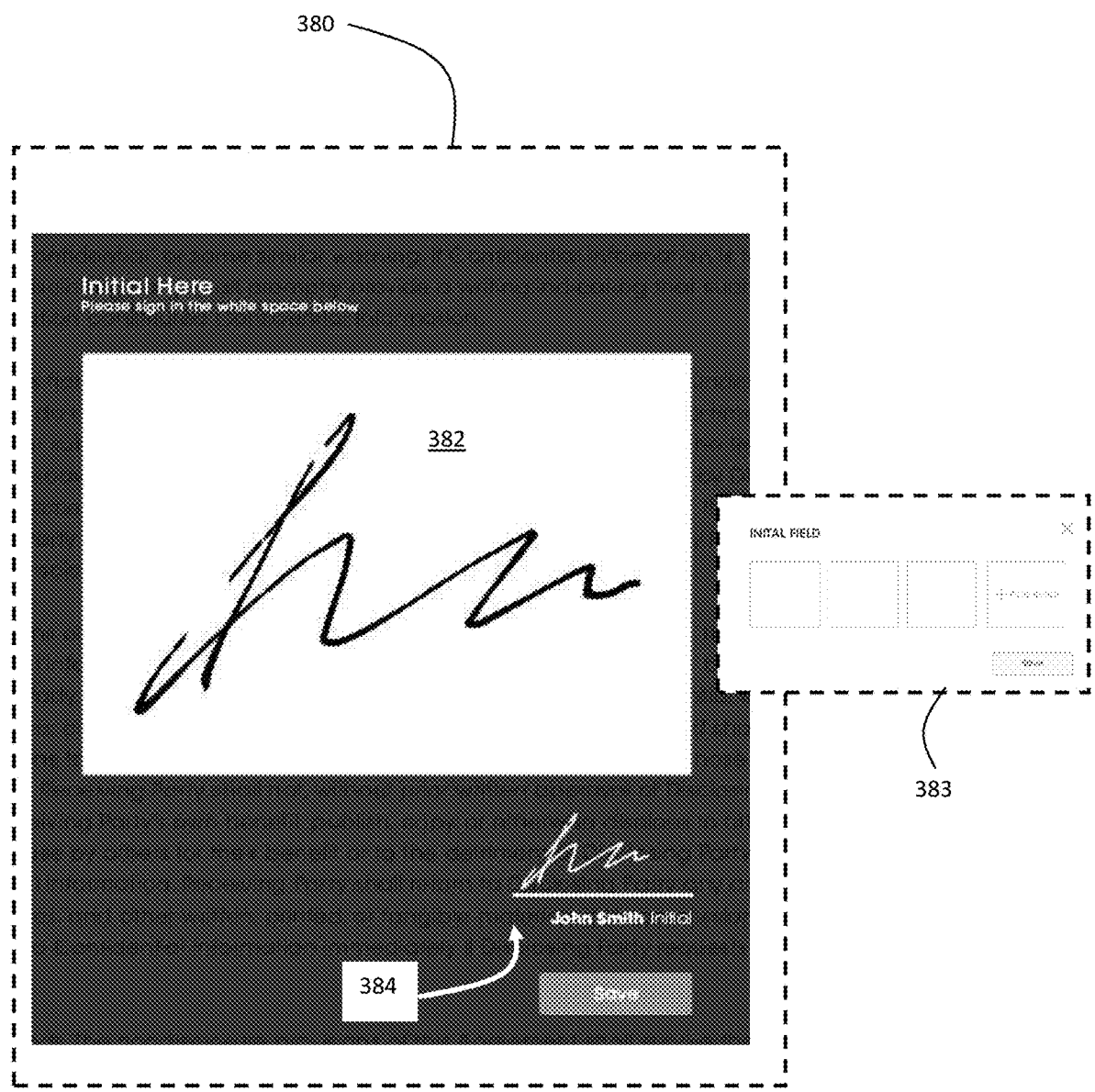
FIG. 13 is a schematic diagram of showing the initialization of the document of FIG. 11.

Similarly, in FIG. 13 the initialization of the document 364 can be done by entering initials in a defined area 382 of screen 380. The initial field 383 may allow multiple persons to provide initials, and may allow addition initials to be requested. A preview 384 may also be shown.

Figure 14:
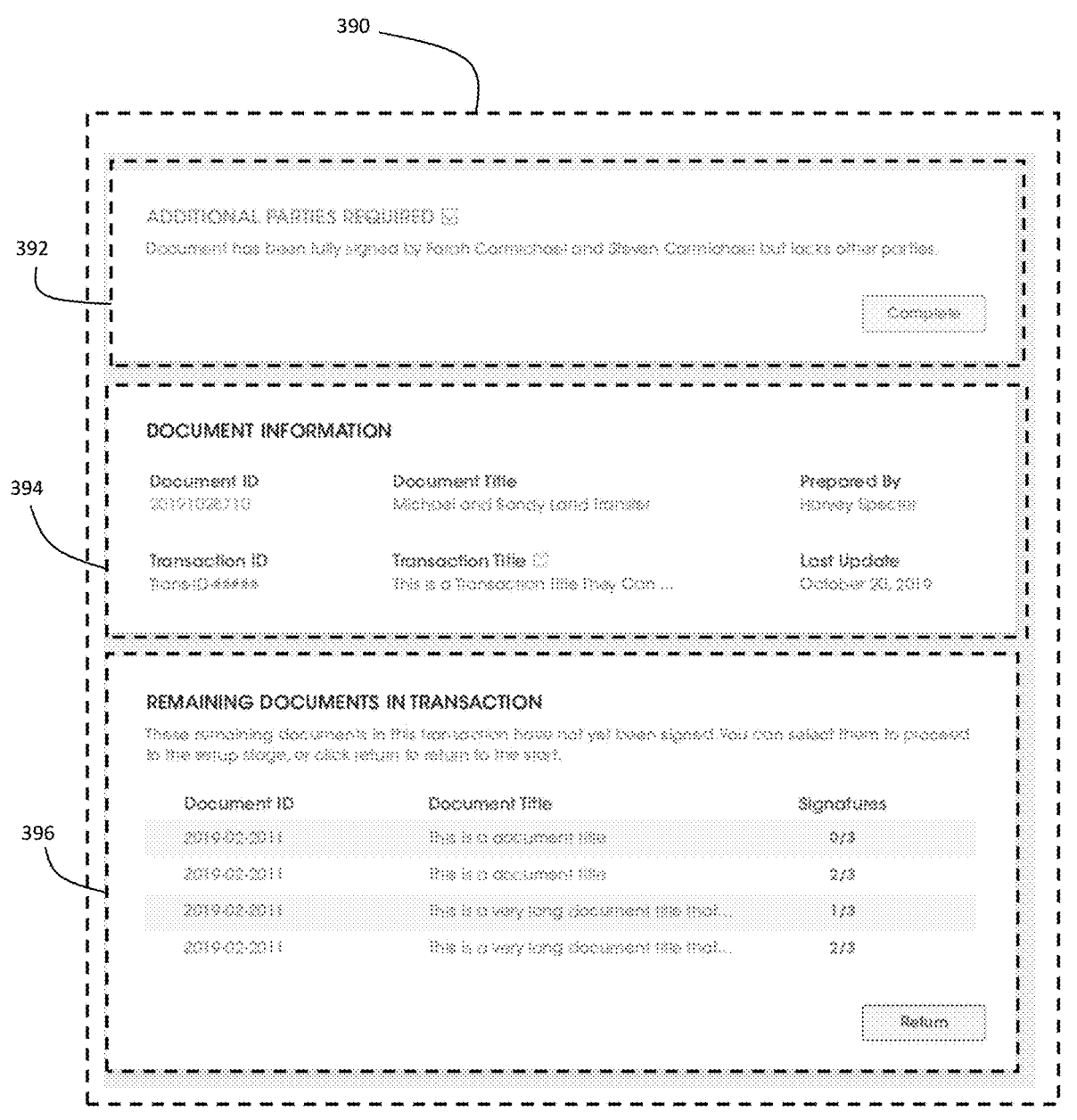

Turning now to FIG. 14, shown therein is a schematic diagram of document and transactional information for the document of FIG. 11. In particular, the screen 390 can show whether additional parties are required at 392, the information about the document at 394, and a list of remaining documents 396.

Figure 15:
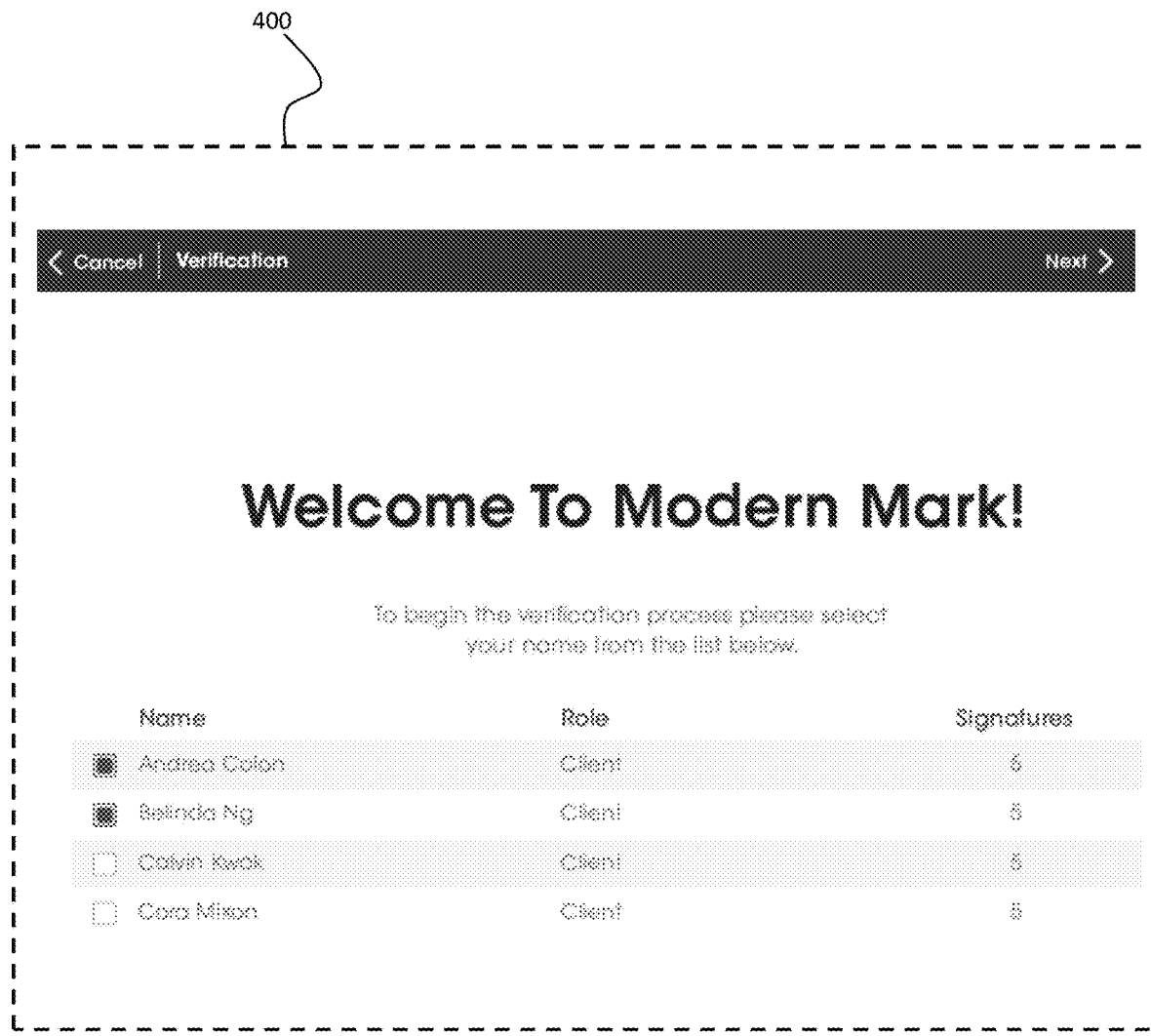
FIG. 15 is a schematic diagram showing the initialization of a user verification process on the device of FIG. 3.

Turning now to FIG. 15, additional details about the user verification process will be described. In particular, FIG. 15 shows a list of users on a screen 400 and allows a user to select their name and begin verification.

Verification continues on FIG. 16, showing a screen 410 with a list of requirements, including taking a photo of the user, capturing a signature, and photographing some IDs.

Figure 17:
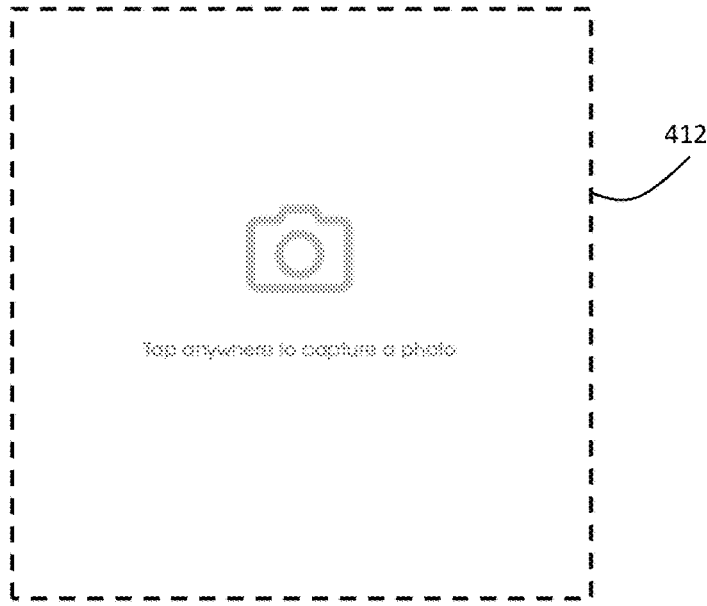
FIGS. 17-18 are schematic diagrams of the user verification process of FIG. 15 showing the capture of a photographic image of the user.
Figure 18:
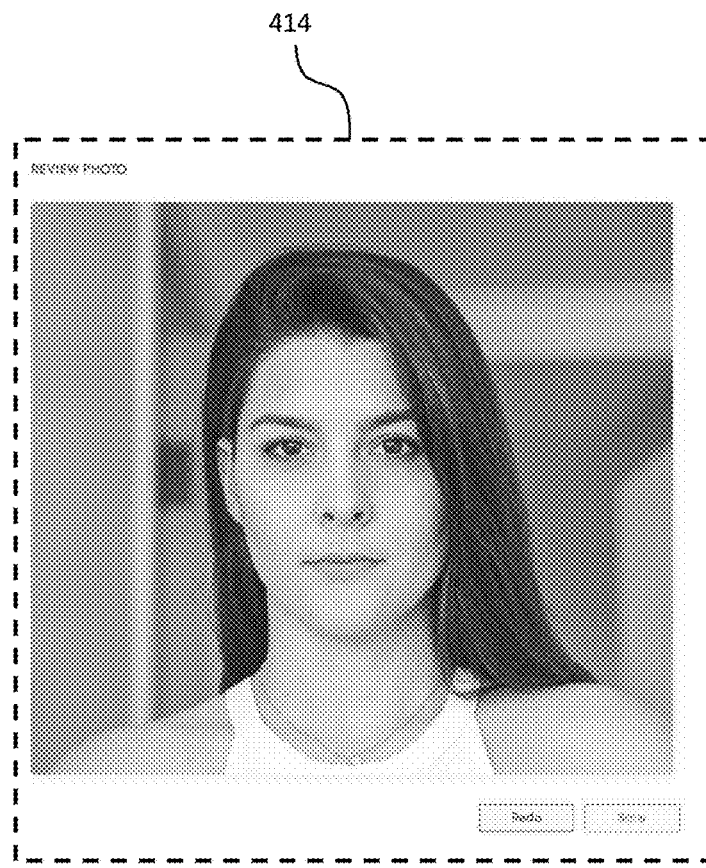

The photo capture process is shown in FIGS. 17 and 18. The user at 412 can use a camera (often a camera built into an electronic device) to take a picture (or "selfie"). The image can then be verified at 414. In some cases, automatic software may be used to determine whether the photo meets certain criteria, such as lighting requirements and the presence of an actual person.

Figure 19:
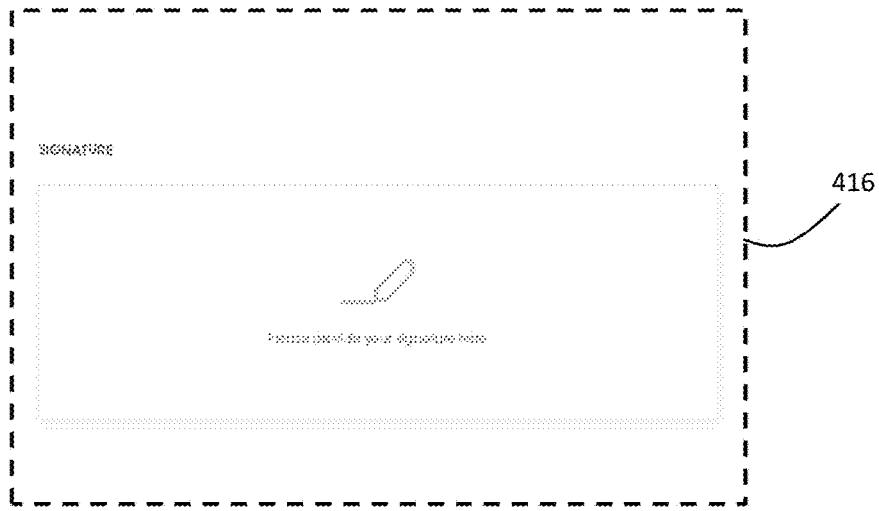
FIGS. 19-20 are schematic diagrams of the user verification process of FIG. 15 showing the capture of a signature of the user.
Figure 20:
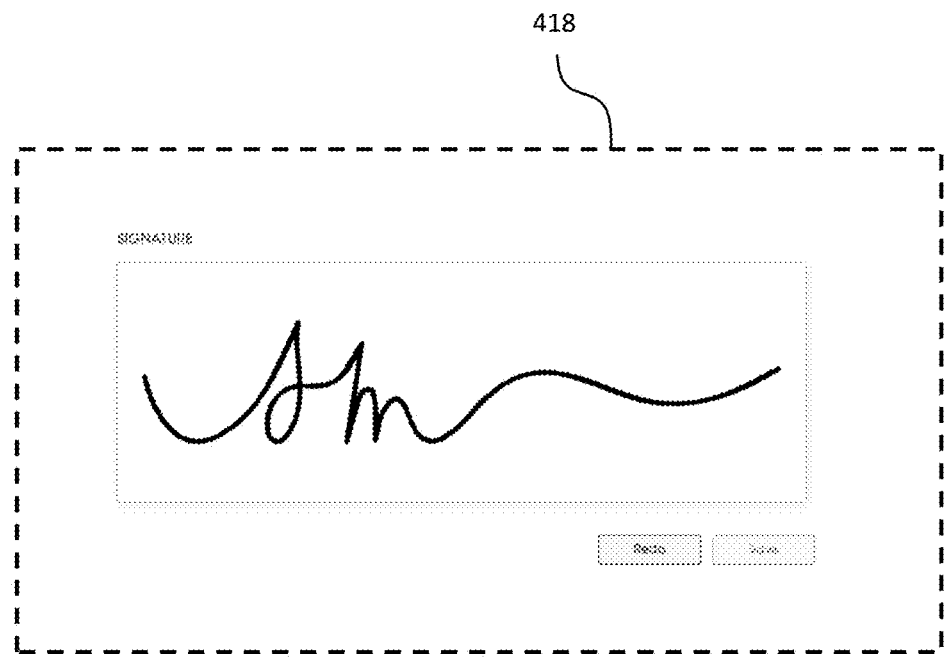

As shown in FIGS. 19 and 20, the user verification process also includes capturing of a signature of the user. In particular, the user can enter their signature in a defined area of the screen 416, which can then be verified at 418.

Figure 21:
FIG. 21 is a schematic diagram of the user verification process of FIG. 15 showing the capture of ID information of the user.

In a similar manner as to FIGS. 17 and 18, as shown in FIG. 21, photographs of user IDs can be used to continue the verification process.

Once this verification process is complete, the verified user profile can be used as a baseline for future signing transactions.

Turning to FIG. 22, shown therein is a schematic diagram of a document overview screen 430. This screen can be used to provide summaries of what signatures and/or initials may be missing for that particular document.

Figure 23:
FIG. 23 is a schematic diagram of a document distribution screen on the device of FIG. 3.

As shown in FIG. 23, parties to receive a particular document can be controlled, and sent copies of the document electronically (for example by email or fax).

Figure 24:
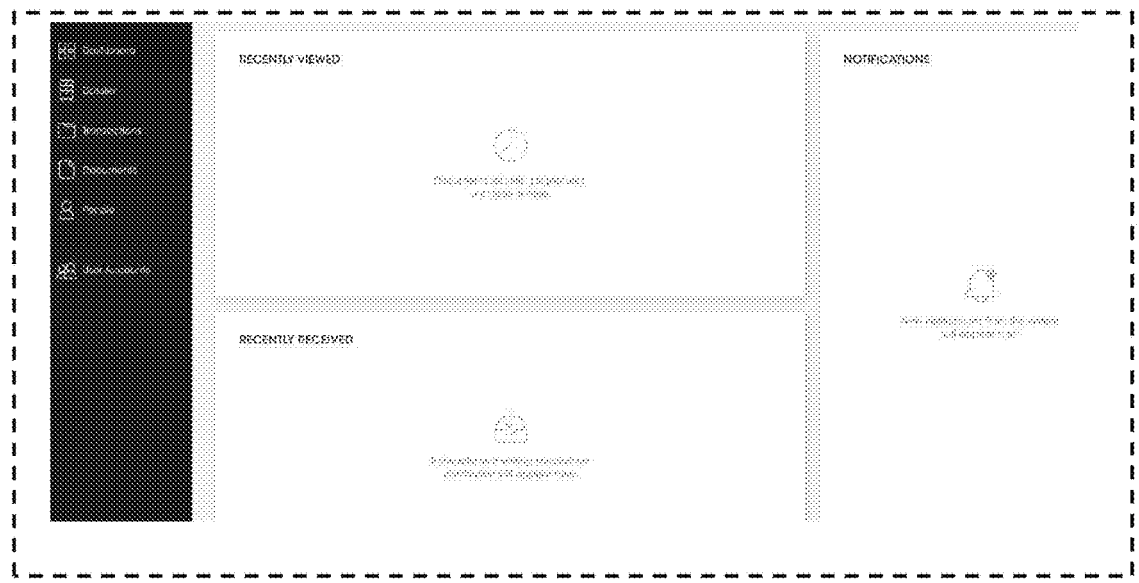
FIGS. 24-25 are schematic diagrams of a user verification system on a different electronic device according to one embodiment.
Figure 25:
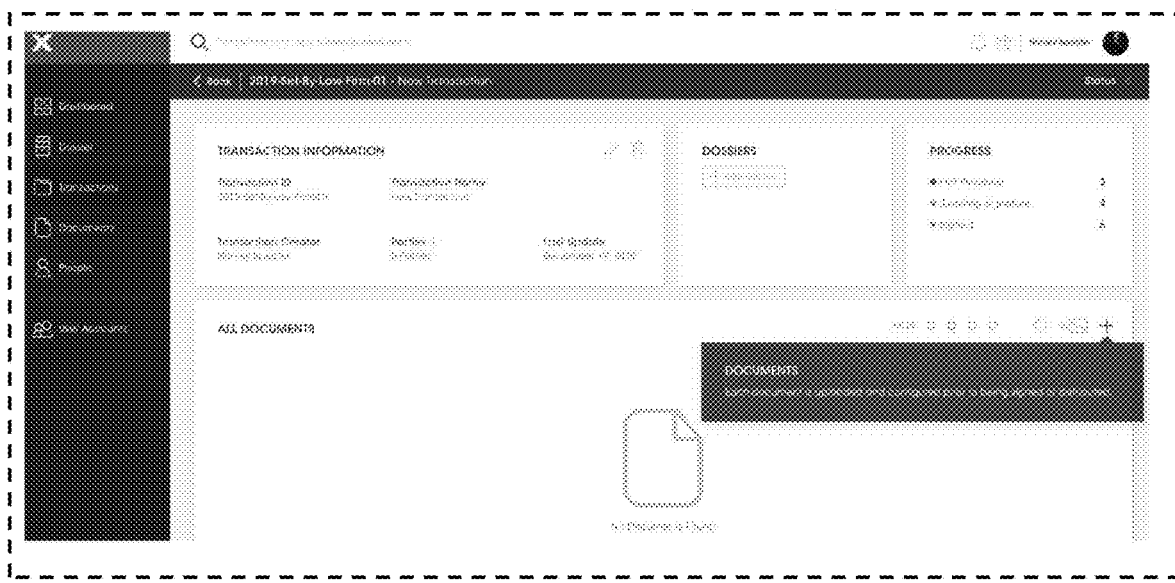

Turning to FIGS. 24 and 25, a user verification system according to a different embodiment is shown, which may be particularly useful for a laptop or other electronic device.

Figure 26:
FIGS. 26-27 are schematic diagrams of a document upload process according to one embodiment.
Figure 27:

Turning now to FIGS. 26 and 27, as shown a document upload process may allow a user to upload documents to the system.

It should be understood that in other embodiments, one or more steps of the above described methods may be modified. In particular, one or more of the steps may be omitted, executed in a different order and/or in parallel, and there may be additional steps.

It should be understood that even though the embodiments are described herein in relation to electronic document systems, they may be applicable in other fields of technology.

While the above description provides examples of one or more apparatus, methods, or systems, it will be appreciated that other apparatus, methods, or systems may be within the scope of the present description as interpreted by one of skill in the art. Moreover, the scope of the claims appended hereto should not be limited by the embodiments set forth in the examples, but should be given the broadest interpretation consistent with the description as a whole.

The invention claimed is:

1. A system for use with a document, the system comprising:
   a pair of devices, each device: having a display; being configured to receive the document; and, in use, being in receipt of the document;
   the pair of devices being configured to cause the document to appear simultaneously on the displays;
   each device being configured:
      when the document appears simultaneously on the displays, to permit a signature to be placed on the display of said each device; and
      such that, when a signature is placed upon the display of one of the pair of devices, the signature appears on the display on the one of the pair and on the display of the other of the pair,
   wherein:
   each device is a tablet computer;
   wherein the tablet computer has a stylus and is configured to permit the signature to be placed on the display using the stylus; and
   the device is adapted to track the pressure of the tip of the stylus as a function of time at least periodically through the placement of the signature.

2. A method for use: with the system of claim 1; with a document; and by a pair of persons, the method comprising:
   distributing the document and the devices to the persons and operating the devices such that:
      one of the pair of persons is in possession of one of the pair of devices;
      the other of the pair of persons is in possession of the other of the pair of devices and in view of the one of the persons; and
      the document appear simultaneously on the displays;
   receiving the signature of the other of the pair of persons on the document which such other remains in the view of the one; and receiving the signature of the one of the pair of the persons on the document.

3. The method of claim 2, wherein, in respect of each of the persons, the signature of said each person is placed via the stylus of the tablet computer in respect of which said each person is in receipt.

4. The method of claim 2, wherein the position of the tip of the stylus as a function of time is tracked at least periodically through the placement of the signature.

5. The method of claim 2, wherein the device is adapted to track the pressure of the tip of the stylus as a function of time at least periodically through the placement of the signature.

6. Use of the method of claim 2, wherein the document is a legal document, the other of the pair of persons is an authorized signatory to the legal document and the one of the pair of persons is a qualified witness.

* * * * *